Nov. 15, 1932.  G. V. ISNARD  1,887,595
PRESSURE REGULATING DEVICE
Filed Jan. 3, 1930
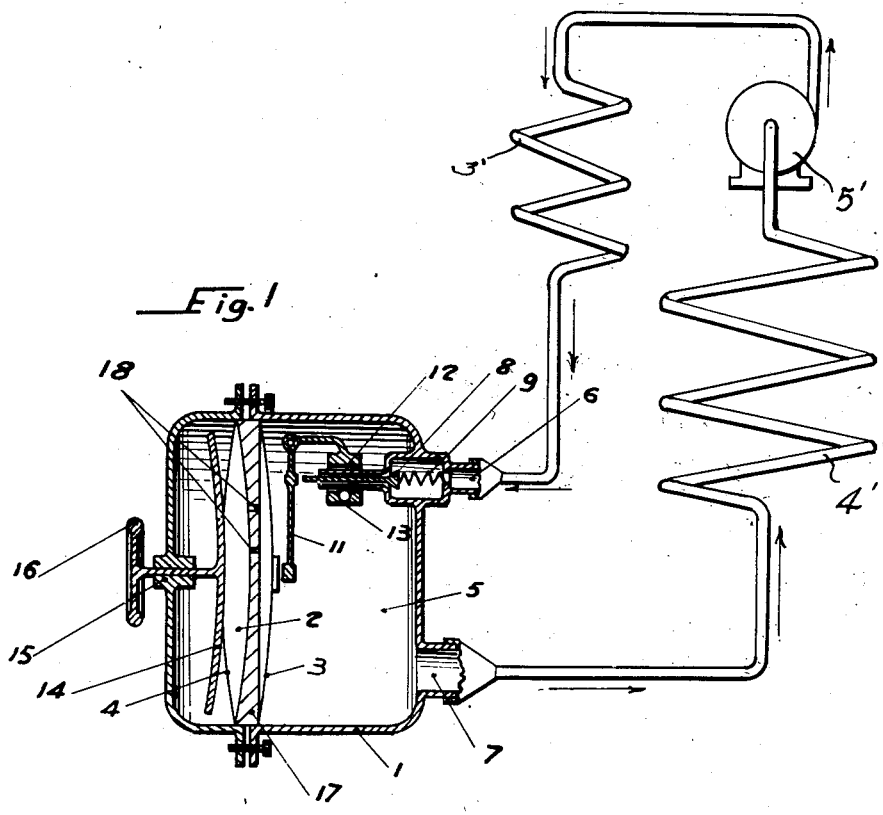
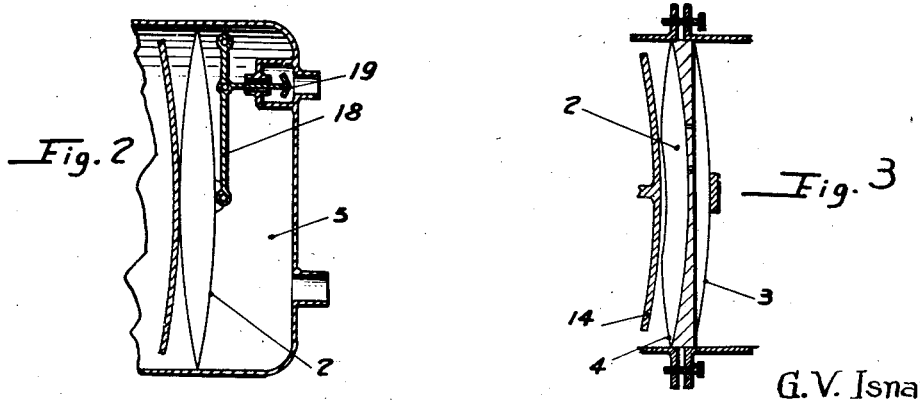
G. V. Isnard
Inventor
By: Marks & Clerk
Attys.

Patented Nov. 15, 1932

1,887,595

UNITED STATES PATENT OFFICE

GEORGES VICTOR ISNARD, OF TOULON, FRANCE

PRESSURE REGULATING DEVICE

Application filed January 3, 1930, Serial No. 418,353, and in France January 14, 1929.

For numerous industrial applications it is necessary to measure exactly a pressure and to actuate certain parts through the variations thereof in view either of regulating the said pressure or else for another purpose—the pressure variations serving only as an intermediary and depending on the variations of another phenomenon such for instance as the temperature, the speed of flow of a fluid and the like.

My invention has for its object a simple and strong device which is affected by very small variations in pressure and allows inter alia a very accurate regulation of an expansion pressure while ensuring a perfect fluid tightness, this being provided without the original pressure exerting substantially any influence on the final pressure attained. My improved device is also designed so as to allow an easy adjustment of its range of operative pressures.

My improved device comprises a chamber where the pressure to be measured prevails and a casing preferably lens-shaped constituted by two yielding diaphragms connected through their edges and containing a fluid the pressure of which may be adjusted before operation. This casing closes the chamber on one side. The diaphragm disposed on the chamber side is submitted to the pressure to be measured; if the latter is different from the pressure inside the casing, the yielding walls of the said casing are deformed and the movement caused by this deformation is made use of for actuating the indicating or regulating apparatus.

My invention has also for its object a device adapted to modify the pressure inside the casing and comprising a suitably shaped plate adapted to bear against the outer diaphragm and to deform it so as to modify the volume of the casing and the tension of the diaphragm if the fluid contained in the casing is compressible and the tension of the diaphragm alone if said fluid is non-compressible.

I may also provide inside the casing a suitably shaped perforated partition limiting the deformation of the diaphragms so as to prevent said deformation to become large enough to cause damage to the said diaphragms. At the same time this partition allows a reduction in the volume between the two diaphragms whereby a considerable range of pressures may be provided inside the casing without requiring a great displacement of the diaphragms.

I have described hereinbelow by way of example and shown on the appended drawing several forms of execution of my invention.

Fig. 1 is a cross-section of one form of execution of my invention as adapted to control a valve.

Fig. 2 is a cross-section of a similar device wherein the inner partition of the casing is omitted.

Fig. 3 illustrates the means for adjusting the pressure inside the casing.

The device according to Fig. 1 comprises a fluidtight chamber 1 wherein prevails the pressure to be measured or regulated.

This chamber is devised into two compartments by the casing 2 the shape of which is similar to that of a double convex lens. This casing 2 is constituted by two yielding diaphragms 3 and 4. The casing 2 forms a fluidtight partition so that the fluid pressure in the right hand side 5 of the casing 1 acts alone directly on the diaphragm 3. The casing 2 is filled with a fluid such as a non-condensing aeriform fluid or a liquid which is brought as disclosed hereinafter to a certain pressure H. Now if a fluid at a different pressure $h$ is caused to enter part 5 of the chamber the casing 2 will be deformed so as to provide an equilibrium between the outer pressure of the casing, its inner pressure which in the case of a non-condensing aeriform fluid will not retain its value H, and the elastic pressures in the deformed diaphragms. If the casing 2 were to contain a liquid, obviously it would when deformed retain its original volume the deformations of the two diaphragms compensating one another.

It is thus apparent that in all cases, to each pressure in the space 5 there corresponds a certain shape of the diaphragm 3. These modifications in shape are used for actuating the regulating or indicating means.

Fig. 1 shows by way of example a device adapted for use in refrigerating machines wherein a cold-producing fluid passes out of a condenser into an evaporator, the heat required for its vaporizing being transferred from the surrounding medium, formed by a non-freezing liquid for instance.

It is important to prevent the cold-producing fluid from passing too speedily into the evaporator and to keep the pressure constant therein whatever the speed of compression and the pressure in the condenser may be, said speed of compression and condenser pressure being variable in practice and causing important disturbances in the working. In view thereof, it is of advantage to insert in the duct connecting the condenser 3' with the evaporator 4' the device shown on Fig. 1 and connected through the pipe 6 with the condenser and through the pipe 7 with the evaporator, there being a compressor 5' connected conventionally between the condenser and the evaporator. In the pipe 6 is arranged a valve 8 urged into its closed position by the spring 9. The valve stem is controlled by the lever 11 the free end of which is disposed in front of the diaphragm 3. When the refrigerating machine is in normal operation, there prevails in the boiler and the chamber 5 a sufficient depression for causing the diaphragm 3 to urge the lever 11 outwards and thereby to keep the valve 8 open. If however, owing to an excess admission of cold-producing liquid, the pressure in the chamber 5 increases, the diaphragm 3 is deformed and urged leftwards; it is then no longer in contact with the lever 11 and the spring 9 urges the valve back into its closed position so as to prevent the cold-producing fluid from entering the space 5 until the pressure therein has returned to its normal value. In order to allow an easy adjustment of the device at the outset, the lever 11 is secured to a slit socket 12 adapted to slide over the end of the pipe 6 and held fast by means of the clamping screw 13.

This arrangement provides moreover a particular interest in ice machines wherein the brine or the like is submitted to a constant expansion temperature, the pressure remaining constant.

It is apparent that the pressure of the fluid contained in the casing 2 is of primary importance and it is therefore of necessity to provide means for modifying it with ease and accuracy.

According to my invention, this is accomplished by acting on the diaphragm 4 through the agency of a suitably shaped plate 14 which may be moved for instance, through the screw 15 and the handwheel 16. If this plate is caused to move towards the right for instance it will bear against the diaphragm 4 which will affect the shape illustrated in Fig. 3. This obviously increases the pressure inside the casing 2. By reason of the very flat shape given to this casing 2, it is apparent that a small movement of the plate 14 will cause a considerable modification of the inner volume of this casing and consequently a proportional modification in the pressure of the non-condensing gas which may fill the casing; this pressure may thus vary between very wide limits. The plate 14 can be actuated in any desired manner, such as through a cam, a differential screw or the like.

If the diaphragms were to be submitted to excessive deformations by the action of the pressure in the casing or of the movement of plate 14, they might be liable to damage; therefore, in order to limit these deformations and to prevent them from reaching an excessive value, I provide inside the casing 2 a longitudinal comparatively thick partition 17 bounded by two surfaces the shapes of which are such that the diaphragms 3 and 4 may bear exactly against them. This partition is of course provided with apertures 18 for interconnecting the two compartments thus formed in the casing 2.

This partition plays thus a double part; on one hand it limits the deformation of the diaphragms 3 and 4; on the other hand it allows a reduction as great as desired of the volume contained between the two diaphragms whereby the range of possible pressures for a small travel of the plate 1 is increased.

Fig. 2 shows another application of the invention wherein the diaphragm 2 acts on a lever 18 for closing the valve 19 when the pressure in the space 5 falls below a predetermined value.

My improved regulating device may obviously have numerous applications beyond its applications to refrigerating machines; it may be applied to manometers working with expanding gas or steam and the operative range of which may be varied between wide limits by means of the movement of the plate 14.

In a word the invention may be applied for measuring or adjusting all phenomena the variations of which may cause a modification in the pressure of any desired fluid. Obviously the diaphragms may be made of any suitable yielding material such as a metal sheet, corrugated or not. Each diaphragm may comprise one or more sheets of different material. I may also use instead of one casing several casings piled one over the other.

What I claim is:

1. A pressure-responsive device comprising a fluid filled piping including a chamber, a fluidtight box filled with a gas not liable to condense, two diaphragms enclosing said box one of which has its periphery secured in an invariable manner to the chamber walls so as to close in an air-tight manner the bottom of the chamber, adjustable means acting on the second diaphragm for controlling the pressure in the box and means controlled by the deformation of the first diaphragm under the differential action of the pressures in the box and in the chamber.

2. A pressure-responsive device comprising a fluid filled piping including a chamber, a substantially lense-shaped fluidtight box filled with a gas not liable to condense, two diaphragms enclosing said box one of which has its periphery secured in an invariable manner to the chamber walls so as to close in an air-tight manner the bottom of the chamber, a plate-shaped part bearing against the second diaphragm, means adapted to adjust the position of said part with reference to the said second diaphragm for controlling the pressure in the box and means controlled by the deformation of the first diaphragm under the differential action of the pressures in the box and in the chamber for controlling the flow of fluid through the piping.

3. A pressure-responsive device comprising a fluid filled piping including a chamber, a substantially lens-shaped fluidtight box filled with a gas not liable to condense, two diaphragms enclosing said box one of which has its periphery secured in an invariable manner to the chamber walls so as to close in an air-tight manner the bottom of the chamber, a perforated concavo-concave partition disposed between and bearing against the outer edge of the two diaphragms adapted to limit the deformation thereof and to reduce the gas-filled space in the box, adjustable means acting on the second diaphragm for controlling the pressure in the box and means controlled by the deformation of the first diaphragm under the differential action of the pressures in the box and in the chamber for controlling the flow of fluid through the piping.

4. In a plant such as an ice machine including a condenser and an evaporator the combination of a pressure regulating chamber inserted in the connection between the condenser and the evaporator, a valve adapted to close the inlet to the casing from the condenser, a substantially lens-shaped box filled with a gas not liable to condense, two diaphragms enclosing said box one of which has its periphery secured in an invariable manner to the chamber walls so as to close in an air-tight manner the bottom of the chamber, adjustable means acting on the second diaphragm for controlling the pressure in the box and a lever arrangement whereby the first diaphragm displaces the valve when the difference in pressure on both sides of the second diaphragm exceeds a certain value.

In testimony whereof I have affixed my signature.

GEORGES VICTOR ISNARD.